United States Patent [19]
Sechet et al.

[11] Patent Number: 6,098,946
[45] Date of Patent: Aug. 8, 2000

[54] SLIDE RAIL FOR A VEHICLE SEAT WITH LONGITUDINAL SETTING MEMORY AND SEAT COMPRISING SUCH A SLIDE RAIL

[75] Inventors: Ange Sechet, La Selle la Forge; Claude Baroin, Flers, both of France

[73] Assignee: Bertrand Faure Equipements SA, Boulogne, France

[21] Appl. No.: 09/309,822

[22] Filed: May 11, 1999

[30] Foreign Application Priority Data

May 12, 1998 [FR] France .................................... 98 05952

[51] Int. Cl.[7] .............................. F16M 11/38; A47C 1/02
[52] U.S. Cl. ........................ 248/424; 248/429; 248/430; 297/341; 297/344.1
[58] Field of Search .................... 248/429, 424, 248/430; 297/344.1, 341; 34/46, 47

[56] References Cited

U.S. PATENT DOCUMENTS

| | | | |
|---|---|---|---|
| 4,852,846 | 8/1989 | Weier | 248/430 |
| 4,881,774 | 11/1989 | Bradley et al. | 297/341 |
| 5,100,092 | 3/1992 | Sovis | 248/429 |
| 5,641,145 | 6/1997 | Droulon | 248/429 |
| 5,688,026 | 11/1997 | Reubeuze | 297/341 |
| 5,855,349 | 1/1999 | Nini et al. | 248/429 |
| 5,931,436 | 8/1999 | Rohee | 248/430 |
| 5,944,383 | 8/1999 | Mathey et al. | 297/341 |
| 5,961,089 | 10/1999 | Soisnard | 248/430 |
| 5,984,254 | 11/1999 | Baloche et al. | 248/430 |
| 6,036,157 | 3/2000 | Baroin et al. | 248/429 |
| 6,036,267 | 3/2000 | Downey et al. | 297/341 |

FOREIGN PATENT DOCUMENTS

0 683 066  11/1995  European Pat. Off. .
WO97/03860  2/1997  WIPO .

*Primary Examiner*—Ramon O. Ramirez
*Assistant Examiner*—Naschica C Sanders
*Attorney, Agent, or Firm*—Marshall, O'Toole, Gerstein, Murray & Borun

[57] ABSTRACT

This concerns a slide rail for a vehicle seat including a fixed section and a "U" shaped mobile section, a memorization runner sliding along the fixed section and defining a memorized position of the mobile section, a runner catch, a first control to simultaneously unlock the slide rail and attach the runner to the mobile section and a second control solely to unlock the slide rail. The memorization runner is brought resiliently to its locked position where it engages with notches provided on the flange of the fixed section. The runner slides on a single flange of the fixed section.

14 Claims, 7 Drawing Sheets

SLIDE RAIL FOR A VEHICLE SEAT WITH LONGITUDINAL SETTING MEMORY AND SEAT COMPRISING SUCH A SLIDE RAIL

FIELD OF INVENTION

The present invention relates to slide rails for an automobile vehicle seat and to seats comprising such slide rails. The invention applies particularly to slide rails intended to be mounted under a front seat of an automobile vehicle which comprises only two side doors.

Access to the rear seats of these vehicles requires the front seats to be moved towards the front of the vehicle, with the backs of these seats being folded down so as to clear the largest possible free space between the back edge of the front seats and the side uprights of the vehicle body which engage with the doors to close the passenger compartment.

BACKGROUND OF THE INVENTION

Generally speaking, such slide rails comprise, as is described in document WO 97/03860:

- a fixed section, intended to be fixed to the vehicle,
- a mobile section, which is sliding mounted along the fixed section and which is intended to be fixed to the seat to allow this seat to move in a so-called longitudinal direction, forwards and backwards, at least the fixed section being of U-shaped transverse section having a web and two flanges, the two sections defining an inner volume, the two flanges of the fixed section being folded towards each other and ending in a hook-shaped return turned inwards from the fixed section and downwards, and the mobile section sliding longitudinally between the two flanges of the fixed section,
- a slide rail catch which is movable between on the one hand, a locked position where said catch immobilises the two sections relative to each other and on the other hand, an unlocked position where said catch allows the mobile section to slide, the slide rail catch being brought resiliently towards its locked position,
- and a memorisation runner which is sliding mounted relative to the fixed section parallel to the longitudinal direction, this runner being placed outside the inner volume of the slide rail,
- an attachment device of the memorisation runner which is movable between on the one hand, an attached position where said attachment device fixes the memorisation runner to the mobile section and on the other hand, an unattached position where said attachment device does not fix the memorisation runner to the mobile section,
- first control means adapted to move the slide rail catch from its locked position to its unlocked position so as to allow the mobile section to slide forwards without the memorisation runner moving, this memorisation runner then restricting the backward movement of the mobile section while defining a memorised position of the mobile section,
- and second control means adapted to move simultaneously the slide rail catch from its locked position to its unlocked position and the attachment device from its unattached position to its attached position, so as to allow the mobile section and the memorisation runner to slide simultaneously relative to the fixed section, either forwards or backwards, in order to adjust the memorised position of the seat.

To access the rear seats of such a vehicle, a passenger activates the first control means, generally with the seat back folding down forwards, then slides the seat towards the front of the vehicle to a stop position. The seat is then put back into its initial position by sliding it towards the rear of the vehicle to its so-called memorised initial position, marked by the memorisation runner.

In the slide rail of the above-mentioned type disclosed by the document WO 97/03860, the memorisation runner is straightforwardly slidingly mounted on the fixed section parallel to the vehicle longitudinal direction without being positively locked on this section when the seat is returned to its initial position. Consequently, mishandling the seat or wear in the memorisation runner may lead to the untimely movement of the memorisation runner and therefore to faulty repositioning of the seat in a displaced position relative to the initial position.

SUMMARY OF THE INVENTION

The particular object of this invention is to overcome these drawbacks.

To this end, according to the invention, a slide rail of the type in question is essentially characterised:

- in that the memorisation runner engages by fitting with a single flange of the fixed section,
- in that a runner catch is carried by the memorisation runner and is movable between on the one hand, a locked position where said runner catch immobilises the memorisation runner relative to the fixed section and on the other hand, an unlocked position where said runner catch does not immobilise the memorisation runner, the runner catch being in the locked position at least when the mobile section returns to the memorised position,
- and in that the flange carrying the memorisation runner comprises notches with which the memorisation runner catch engages when the runner catch is in the locked position.

By means of these arrangements, the memorisation runner is held positively locked in the memorised position at least at the exact moment when the seat is returned to its initial position. The slide rail according to the present invention thus guarantees good memorisation of the last slide rail position setting using straightforward, effective and inexpensive means.

In preferred versions of the invention, use may possibly be made additionally of one and/or the other of the following arrangements:

- the notches are carried by the hook-shaped return of the flange carrying the memorisation runner;
- the runner catch is brought resiliently to its locked position by a spring mounted on the memorisation runner with the result that in the unattached position of the attachment device, the memorisation runner is locked on the fixed section;
- the attachment device is brought resiliently to its unattached position;
- the first control means move the attachment device into its unattached position simultaneously with the movement of the slide rail catch from its locked position to its unlocked position to allow the mobile section to slide forwards without the memorisation runner moving;
- the attachment device is mounted on the second control means;
- the first and second control means are mounted on a support part integral with the mobile section and the first control means activate the second control means to move the slide rail catch from its locked position towards its unlocked position;

the support part carries a pawl which is mounted moving between an engaged position where it engages with the second control means to hold the slide rail catch in its unlocked position when the mobile section slides forwards or backwards without the memorisation runner moving, and a disengaged position where it abuts against the memorisation runner;

the mobile section is of inverted U-shaped transverse section having a web and two flanges which extend outwards and upwards by a return which is engaged under the hook-shaped return of the fixed section, the support part including a web fixed to the web of the mobile section and an overlap extending parallel to the flange of the fixed section which carries the memorisation runner, a stop pin projecting from the web of the support part to abut, simultaneously with the pawl, against the memorisation runner, when the mobile section returns to the memorised position;

the first means comprise a control arm rotary mounted on the support part web, and a rod rotating integrally with said arm, said rod having a nose and a pin which engage respectively with the second control means and the attachment device;

the second control means comprise a flank extending approximately parallel to the overlap of the support part being rotary mounted on this overlap, a rear end of said flank supporting a lug extending transversally above the web of the mobile section so as to be in contact with the slide rail catch;

the memorisation runner carries on the one hand, a side wedge fitted with a back stop which is extended by an inclined surface downwards and forwards and on the other hand, a rotary longitudinal arm a front end of which carries the runner catch and a rear end of which is curved on the opposite side from the fixed section; and the attachment device of the runner includes a lever rotary mounted approximately on the rear end of the flank of the second control means and a front end of which has a ramp engaging with the rod pin of the first control means so that the rotary motion of said rod causes a reverse rotation of the attachment device, and the rear end of which has on the one hand, a tracker pin downward pointing so as to engage with the side wedge of the runner and to the rear of which projects a support surface located at the base of the curved rear end of the memorisation runner arm, so that when the runner moves, the support surface engages said curved rear end and the tracker pin is supported against the stop of the runner wedge.

Furthermore, an additional object of the invention is a vehicle seat comprising a seat part sliding mounted longitudinally by means of at least one slide rail as defined above, the seat part of the seat being fixed to the mobile section of the slide rail.

BRIEF DESCRIPTION OF THE DRAWINGS

Other characteristics and advantages of the invention will become clear during the following description of one of its versions, given as a non-restrictive example, with reference to the appended drawings, in which.

DETAILED DESCRIPTION OF THE PREFERRED EMBODIMENT

Figures 1, 2:
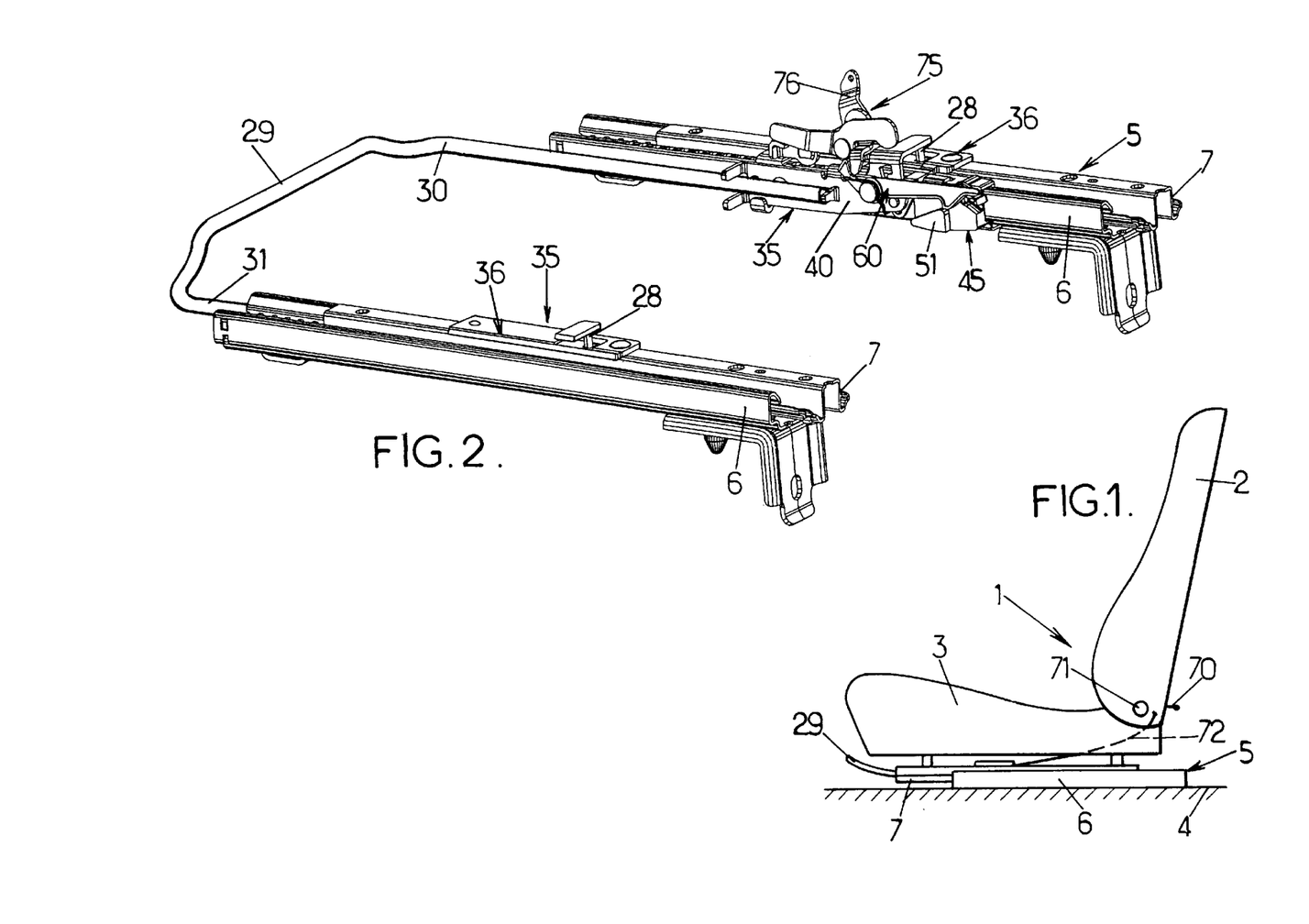
FIG. 1 is a diagrammatic view of a vehicle seat fitted with a slide rail according to the present invention.
FIG. 2 is a perspective view showing the slide rails of the seat in FIG. 1.

A seat 1 for an automobile vehicle, and more particularly a front seat, is shown in FIG. 1. This seat includes, in a way known per se, a seat back 2 swivel mounted on a seat part 3 itself fixed to the floor 4 of the automobile vehicle by means of two parallel slide rails 5 which each extend in a so-called longitudinal direction to allow the seat assembly 1 to move towards the front or the rear of the vehicle.

Each slide rail 5 is constituted, on the one hand, by a fixed section or female section 6 fixed to the vehicle floor 4, and on the other hand, a mobile section or male section 7 which is fixed to the seat part 3 of the seat and which is slidingly mounted in the fixed section 6 parallel to the longitudinal direction of the seat.

Figure 6:
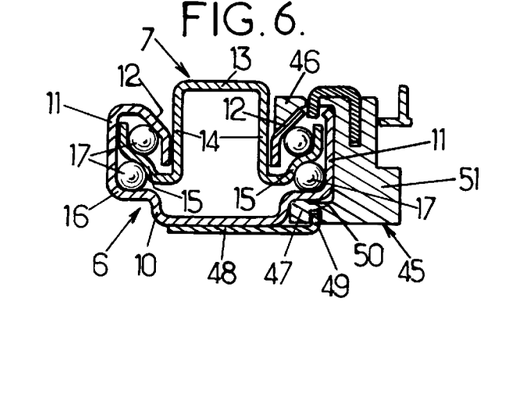
FIG. 6 is a transverse sectional view of the single memorisation runner mounted on the slide rail in FIG. 5.

As is shown particularly in FIG. 6, the fixed section 6 is of a general upwardly opening "U" shape, comprising a web 10 and two flanges 11 folded towards each other and ending in a hook-shaped return 12 turned inwards to the section and downwards.

The mobile section 7 is also of a general downward opening "U" shape, with the result that the two sections are inverted to define an inner volume. The mobile section has a web 13 and two flanges 14 which extend, outwards and upwards, by a return 15 which engages under the hook-shaped return 12 of the fixed section 6. The flanges 11 and the web 10 of the fixed section 6 form rounded inner corners 16 which define, in conjunction with the flanges' returns 15 of the mobile section 7 and the flanges' returns 12 of the fixed section, ball races for balls 17 which are interposed in them, in order to provide easy sliding of the mobile section 7 in the fixed section 6.

The mobile section 7 is immobilised relative to the fixed section 6 by means of a slide rail catch 20 which is housed inside the inner hollow space delimited by these two sections and which is normally in a locked position. As is shown more particularly in FIG. 5, the catch 20 comprises a front end 21 which is fixed under the upper web 13 of the mobile section 7 by welding, riveting, or the like and which is extended forwards by a projection 22 extending approximately vertically and downwards, then by a rear part 23 slightly inclined relative to the horizontal. This rear part 23 is movable vertically by bending of the catch 20 and has towards its rear end side teeth 24 which extend in the transverse horizontal direction and which, in the off position, penetrate into notches 25 of the fixed section 6 passing through ports provided in the vertical flanges 14 of the mobile section 7.

Figure 5:
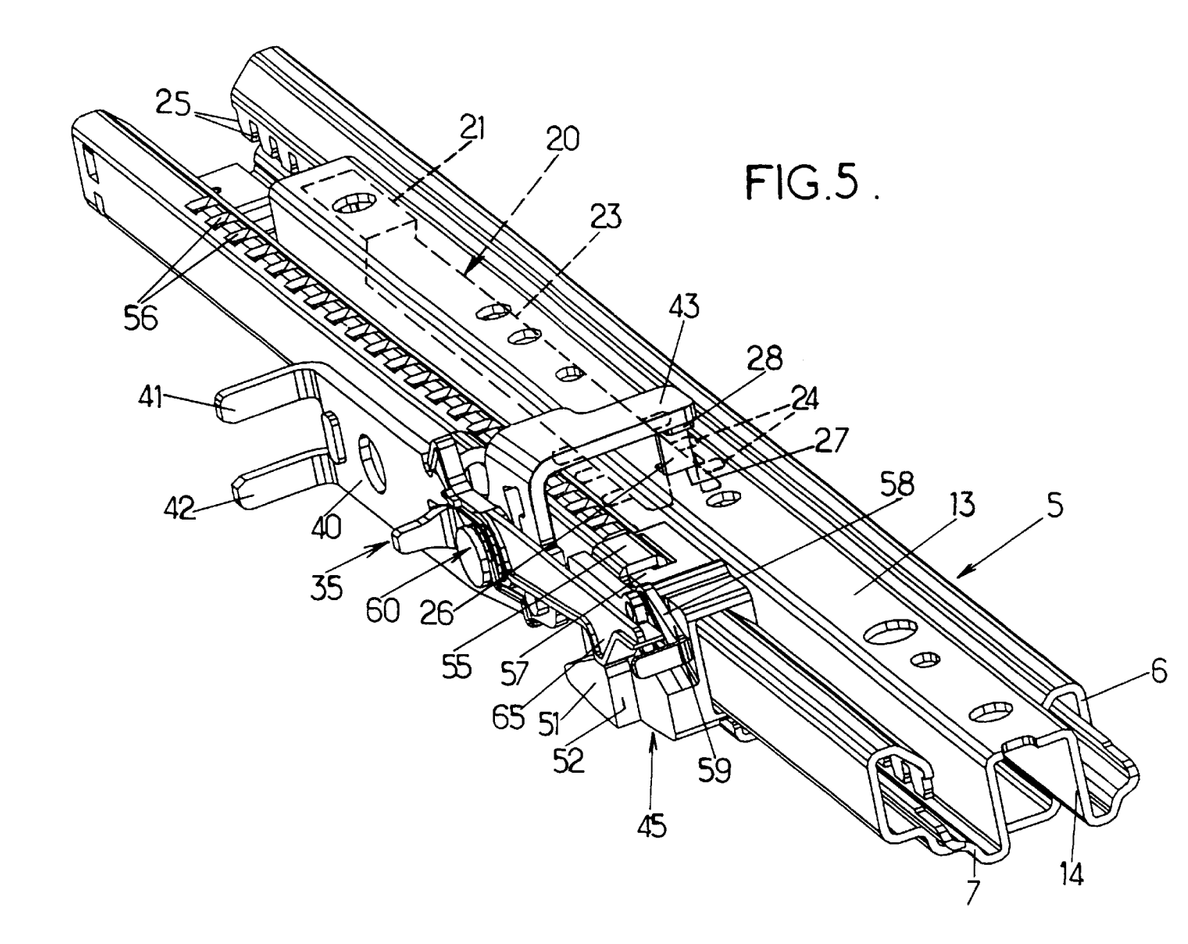
FIG. 5 is a perspective view of the slide rail in FIG. 3, the first control means and the support part having been withdrawn.

The rear end of the slide rail catch 20 comprises furthermore a projection 26 which extends upwards, passing through an opening 27 provided in the upper web 13 of the mobile section and which ends by a horizontal support ledge 28.

The catches 20 of the two slide rails 5 can be unlocked simultaneously when the passenger in the seat 1 pulls upwards on a control bar 29 (FIG. 1) which has a general "U" shape the base of which is located under the front end of the seat and the branches 30 and 31 of which are mounted rotating integrally with control means 35 adapted to engage with the support ledge 28 of each catch.

The control means 35 are carried by a metal support part 36 (FIGS. 3 and 4) itself fixed by welding, riveting or the like on the upper web 13 of the mobile section 7. The support part 36 is constituted by a longitudinal web 37 which is fixed to the web 13 of the mobile section 7 and with which has been integrally made a vertical overlap 38 which extends parallel to the flange 11 of the fixed section 6. The web 37 of the support part 36 is fixed approximately at the base of the catch 20 and has in the rear part, a channel 39 through which the support ledge 28 of the catch 20 projects.

Figure 3:
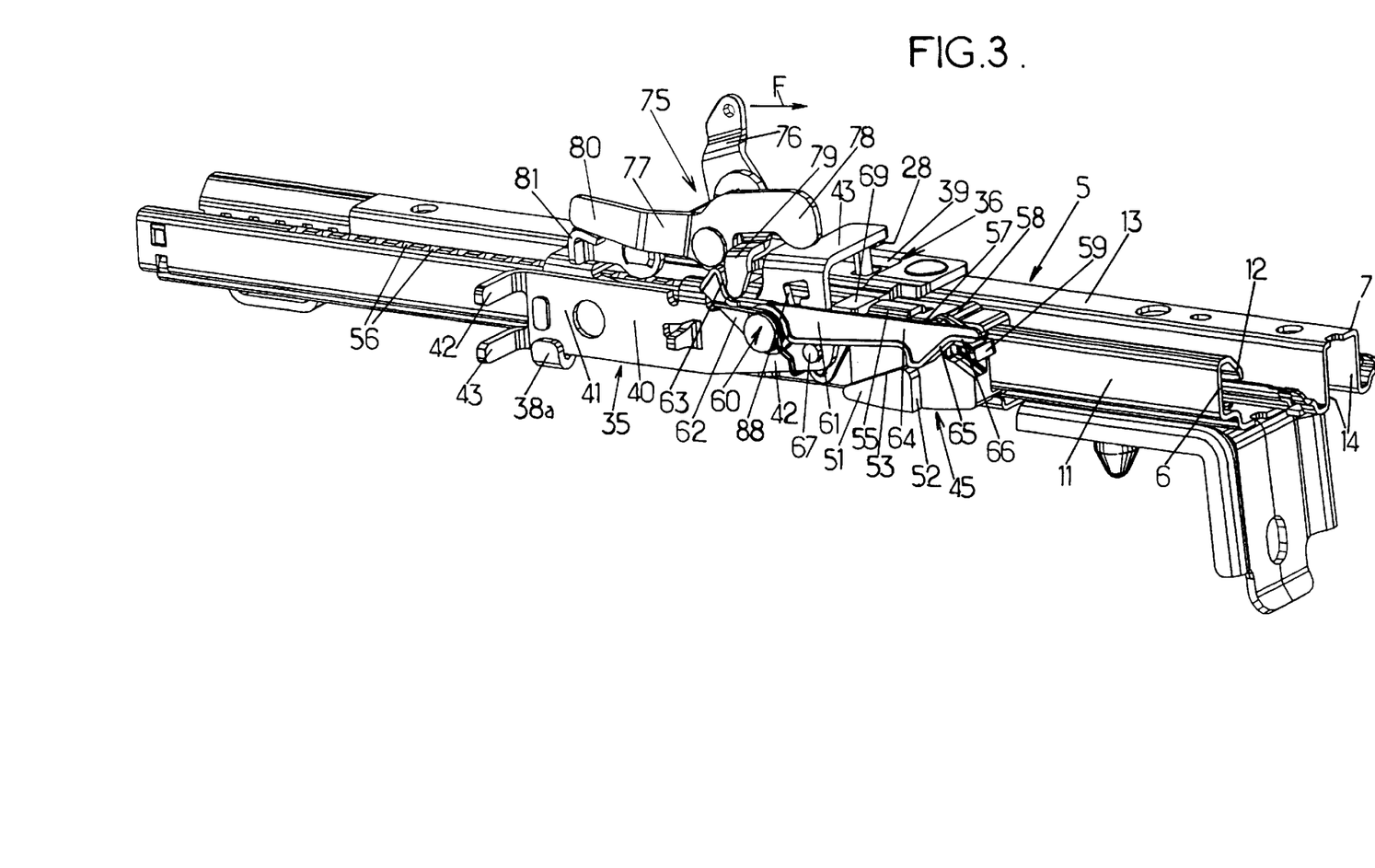
FIG. 3 is a perspective view of one of the slide rails in FIG. 2, in the off position.
Figure 4:
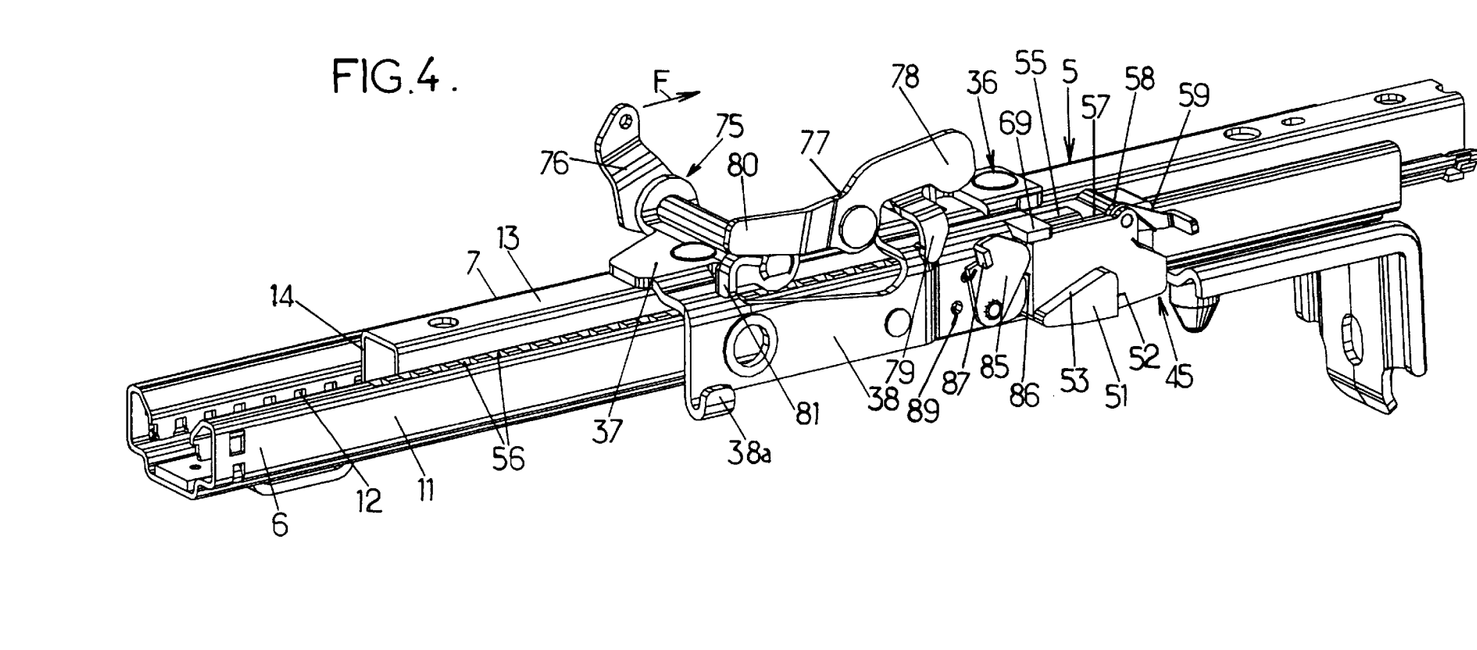
FIG. 4 is a perspective view of the slide rail in FIG. 3, the second control means and the attachment device having been withdrawn.

In the lower part of the overlap 38 and at the front end of the support part 36, extends a hook 38a turned upwards and orientated between the two slide rails.

The control means 35 are constituted by a folded metal part including a vertical flank 40 which extends approximately parallel to the overlap 38 of the support part 36 and which is rotary mounted on this overlap. The rear end 41 of the flank 40 is configured in two pins 42 and 43 folded on the opposite side from the flange 11 of the fixed section 6 and through which extends one of the two branches 30, 31 of the control bar 29.

The rear end 41 of the flank 40 is integrally made with a horizontal lug 43 which extends in the upper part of the flank 40 at the base of the web 13 of the mobile section 7 to be supported on the ledge 28 of the catch 20.

The flank 40 is acted upon by a resilient metal wire (not shown) which is supported on the support part 36 in order to act, in the off position, on the flank 40 in a position where the lug 43a does not press on the ledge 28 of the catch 20 so that it is normally engaged with the notches 25 of the fixed section 6. The flank 40 is then stopped in the hook 38a.

In this way, when a passenger wishes to adjust the longitudinal position of the seat, he/she activates the control bar 29 upwards. The flank 40 is then rotated and the lug 43a presses on the ledge 28, which unlocks the two catches 20 of the two slide rails 5 and allows the mobile sections 7 to slide relative to the fixed sections 6. During this movement, the mobile section 7 of one of the two slide rails brings with it a memorisation runner 45.

This memorisation runner allows the last longitudinal position setting of the seat to be memorised, when a user wishes to move the seat assembly rapidly to the maximum forward position, for example to gain access to the rear seats of the vehicle if the seat 1 is placed in the front of a vehicle with two side doors.

The memorisation runner 45 is slidingly mounted on the fixed section parallel to the longitudinal direction of the seat and is placed outside the volume of the slide rail defined by the two sections engaging by fitting with a single flange 11 of the fixed section 6. This runner is advantageously moulded of plastic material and slides along the fixed section with friction. The side of the memorisation runner 45 turned towards the flange 11 of the fixed section 6 is complementary in shape to this flange (FIG. 6) with the result that an upper ledge 46 extends on the hook-shaped ledge 12 of this flange whereas a lower ledge 47 extends between the lower part of the flange 11 and a horizontal metal plate 48 for example welded to the web 10 of the fixed section 6. In order further to provide a better positioning of the memorisation runner on the section 6, the inner ledge 49 of the metal plate 48 is curved upwards to penetrate inside a groove 50 provided in the lower ledge 47 of this runner. The length of the plate 48 is approximately equal to the amplitude of the movement of the mobile section on the fixed section.

The side of the memorisation runner opposite the flange 11 carries a side wedge 51 which has a back stop 52 extending vertically and transversally and which extends by a surface 53 inclined downwards and forwards.

The memorisation runner 45 carries furthermore a runner catch 55 which is mounted to move between on the one hand a locked position where the runner catch immobilises the runner relative to the fixed section and an unlocked position where said runner catch does not immobilise the runner. In the locked position, the runner catch 55 carries downward pointing vertical teeth intended to engage with notches 56 provided on the hook-shaped return 12 of the flange 11 of the fixed section 6 carrying said runner. The catch 55 is carried by a front end 57 of a longitudinal arm 58 itself rotary mounted on the runner 45. The rear end 59 of the arm 57 is horizontally curved on the opposite side from the fixed section 6.

In order to move the memorisation runner during longitudinal adjustment of the seat, an attachment device 60 is rotary mounted at the rear end 42 of the flank 40 of the first control means 35. This attachment device 60 of the runner 45 is constituted by a longitudinal lever 61 which is rotary mounted at the rear end 42 of the flank 40 and which has:

a front end 62 with which is integrally made an upward and forward pointing ramp 63, and a rear end 64 equipped on the one hand, with a tracker pin 65 which is pointed downwards so as to engage with the back stop 52 of the wedge 51 of the runner 45 and on the other hand, a support surface 66 located approximately in a horizontal plane and which projects approximately at the base of the curved rear end 59 of the arm 58 of the memorisation runner 45.

The lever 61 of the attachment device 60 is rotated by a resilient metal wire 66a supported on the flank 40 of the control means 35 to act downwards on the rear end 64. A stop lug 67 is carried by the rear end 42 of the flank 40 to lock said lever 61 end in downward rotation so that in the off position, the tracker pin 65 is disengaged from the wedge 51 and the support surface 66 is not supporting the curved end 59 of the arm 57 of the memorisation runner.

When the seat is returned to its memorised position, the backward motion of the mobile section 7 is stopped by the abutment of a stop pin 69 against the runner catch 55. This stop pin 69 extends horizontally from the rear end of the support part 36.

Furthermore, when a user wishes to gain access to the rear seats or to leave the rear seats of the vehicle, he/she activates for example a handle 70 (FIG. 1) or similar control component which releases the seat back 2 to rotate around a transverse horizontal pivot pin 71. The seat back 2 then pivots forwards, to a folded forward position.

This pivoting movement of the seat back 2 tensions a sheathed cable 72 which then activates control means 75. These control means allow the unlocking of the slide rail catch 20 so that the mobile section moves relative to the fixed section without involving the memorisation runner 45.

The control means 75 include a control arm 76 which is rotary mounted on the web 37 of the support part 36 and which controls in rotation a longitudinal rod 77 which has in the rear part, a longitudinal nose 78 and a pin 79 extending downwards.

The nose 78 supports the horizontal lug 43a of the control means 35 whereas the pin 79 engages with the ramp 63 of the lever 61 of the attachment device 60.

The control means 75 are rotated by a resilient metal wire (not shown) with the result that the nose 78 is brought upwards, the rod 77 having a front end 80 supported on a stop 81 integrally made with the support part 36.

The tension exerted on the sheathed cable 72 during the pivoting movement of the seat 2 rotates the control arm 76 along the direction of the arrow F shown in FIGS. 3 and 4. This rotation movement drives the same rotation of the rod 77. This movement has a dual effect: on the one hand, the nose 78 presses on the horizontal lug 43a, which allows the catch 20 to unlock and on the other hand, the pin 79 slides on the ramp 63, which causes an upward movement of the second end 64 of the attachment device 60, and allows the tracker pin 65 of the abutment stop 52 of the memorisation runner 45 to be kept disengaged, the support surface 66 remaining also disengaged from the curved end 59 of the runner catch. The seat can then be moved forwards whereas the memorisation runner 45 remains locked on the flange 11 of the fixed section 6.

In order to keep the catch 20 unlocked during access to the rear seats of the vehicle, the overlap 38 of the support part 36 carries a plane pawl 85. This pawl is rotary forwards and backwards and has a rear face 86 intended to abut against the memorisation runner 45. A lug 87 projects perpendicularly to the plane of the pawl 85 to engage with a set square shaped slot 88 provided in the rear end 42 of the flank 40 of the control means 35. A spring 89 acts on the pawl 85 in the rear position. In this way, when the seat is disengaged forwards, the pawl 85 pivots in the rear position simultaneously to the downward movement of the rear end 42 of the flank 40 carrying the slot 88. The lug 87 is then stopped in the horizontal part of the slot 88, which keeps the horizontal lug 43 in the down position pressing on the catch 20.

Figure 7:
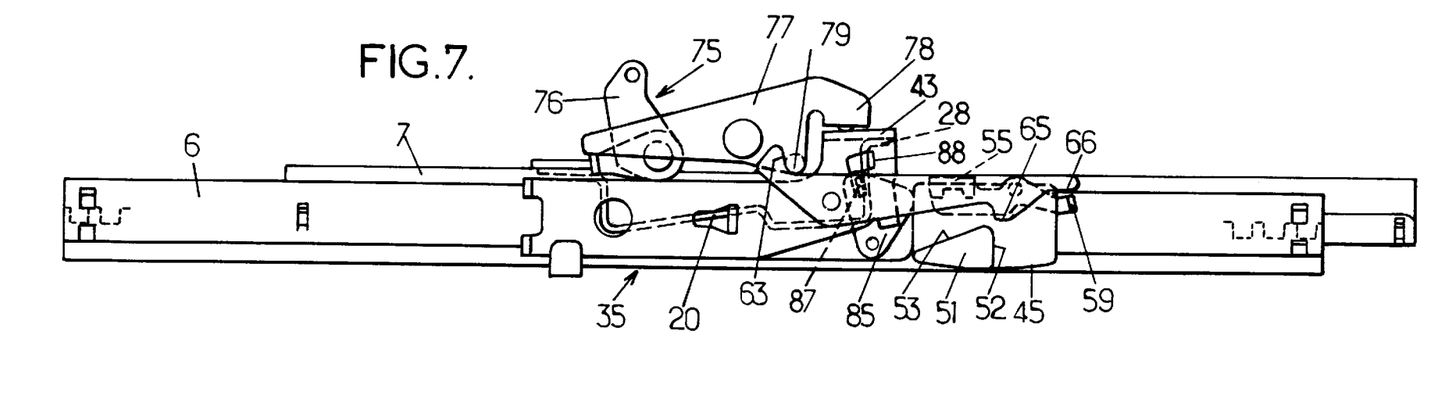
FIGS. 7 to 11 are side views showing respectively the slide rail according to the present invention in the off position, in the position of longitudinal setting of the seat, when the seat back is folded down on the seat part to give access to the rear seats, when the seat is moved forwards to give access to the rear seats, and when the seat is returned to its memorised position.

In the off position shown in FIG. 7, i.e. when the seat is in a position of use where a passenger can sit down, the catch 20 immobilises the mobile section 7 relative to the fixed section 6, the rear end 42 of the flank 40 of the control means 35 is in the up position, which allows the attachment devices 60 to be kept disengaged from the memorisation runner 45.

Figure 8:
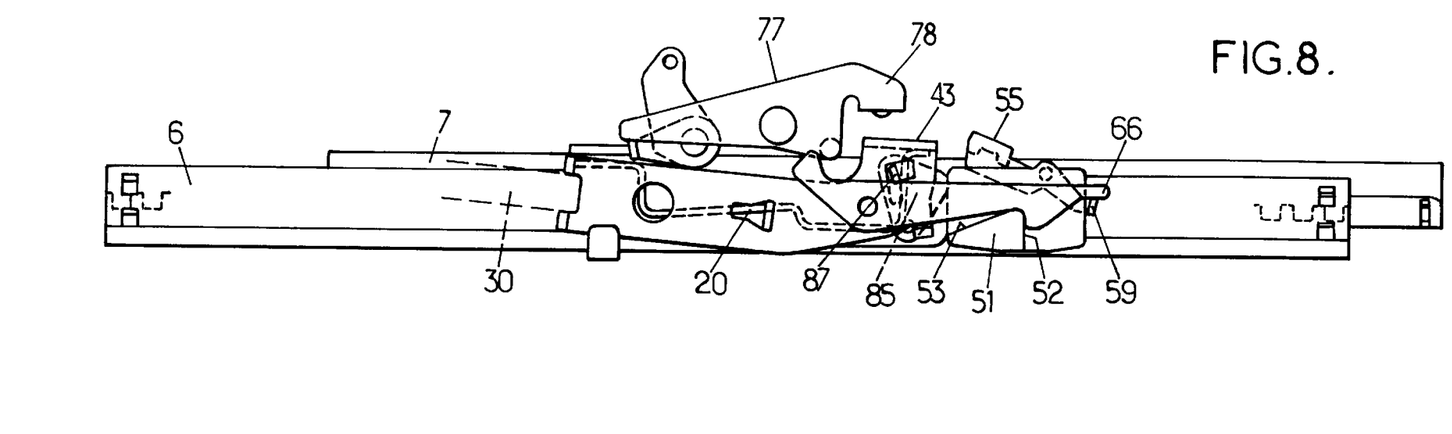

When the passenger wishes to adjust the longitudinal position of the seat, he/she activates the control bar 29 upwards, which causes the flank 40 to rotate (FIG. 8). The rear end 42 of the flank 40 is then lowered, which causes the unlocking of the catch 20 and the engagement of the tracker pin 65 with the back stop 52 of the memorisation runner 45. Furthermore, the support surface 66 is supported on the curved end 59 of the catch 58 of the memorisation runner, which unlocks this runner. It is then guided in forward and backward motion along the fixed section 6 by the stop pin 69 of the support part 36 and the tracker pin 65.

Figure 9:
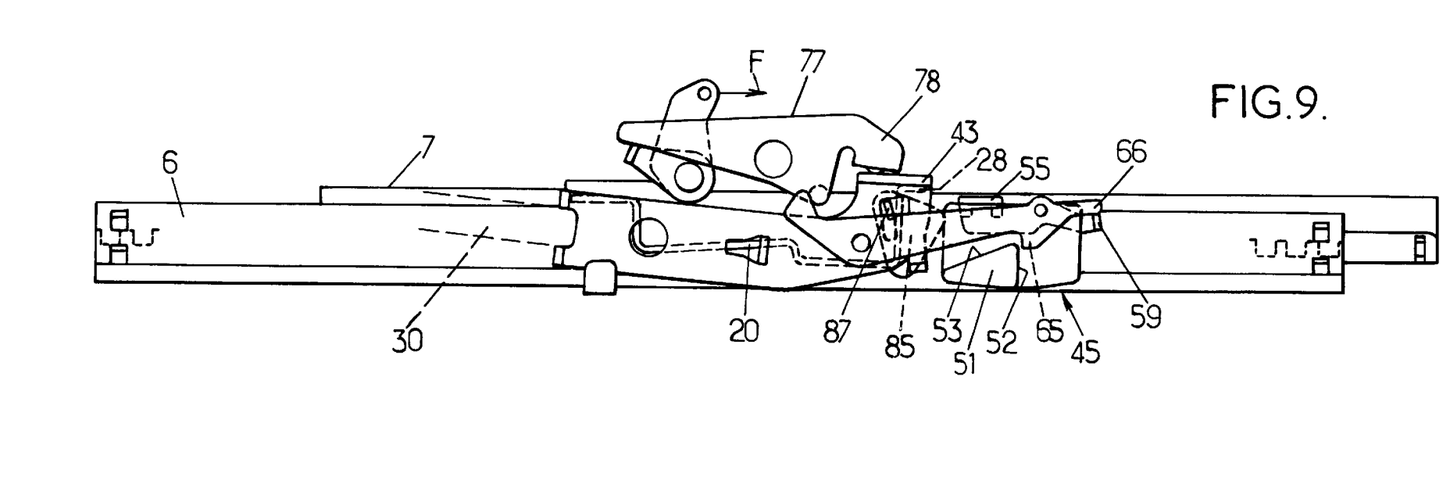

When the passenger wishes to gain access to the rear seats of the vehicle, he activates the handle 70, which affects the control means 75 along the direction of the arrow F (FIG. 9). This movement rotates the nose 78 which then presses on the ledge 28, unlocking the catch 20 simultaneously with the sliding of the pin 79 on the ramp 63 of the lever 61 of the attachment device 60. The memorisation runner is thus held locked on the flange 11 of the fixed section 7, thus defining the memorised position.

Figure 10:
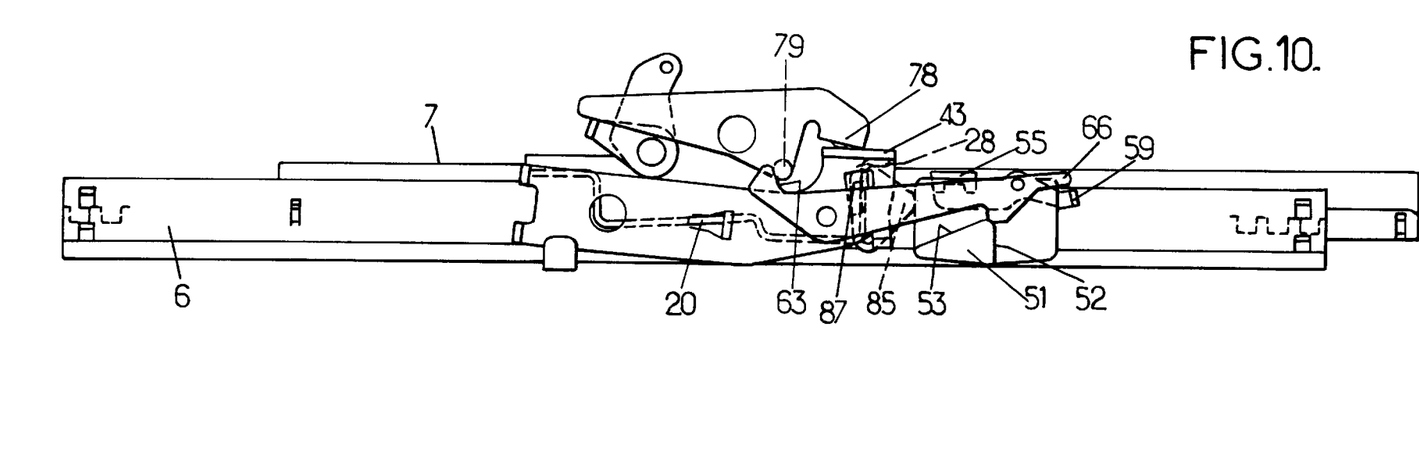

When the seat is then disengaged forwards (FIG. 10), the pawl 85 pivots backwards, actuating the lug 87 in the slot 88 of the control means 35. The catch 20 is thus kept in the unlocked position even if the control means 75 have returned to the off position, the nose 78 no longer pressing on the horizontal lug 43a.

Figure 11:
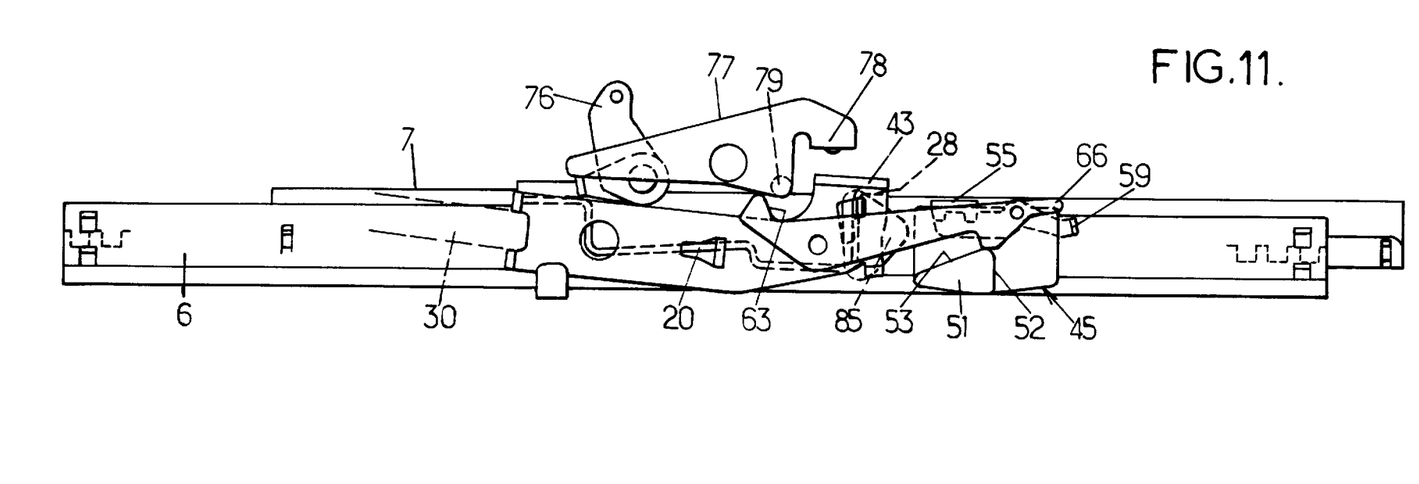

In FIG. 11 is shown the backward motion of the seat when the passenger wishes to return to the initial memorised position. The tracker pin 65 of the attachment device 60 slides on the inclined surface 53 of the wedge 51 of the memorisation runner 45 whereas the pawl 85 abuts against the runner 45, thus releasing the control means 35. The horizontal lug 43a then returns to the up position and the catch 20 again immobilises the mobile section 7 relative to the fixed section 6.

What is claimed is:

1. A slide rail for an automobile vehicle seat, including:
   a fixed section, intended to be fixed to the vehicle,
   a mobile section, which is sliding mounted along the fixed section and which is intended to be fixed to the seat to allow the seat to move in a longitudinal direction, forwards and backwards, at least the fixed section being of U-shaped transverse section having a web and two flanges, the two sections defining an inner volume, the two flanges of the fixed section being folded towards each other and ending in a hook-shaped return turned inwards from the fixed section and downwards, and the mobile section sliding longitudinally between the two flanges of the fixed section,
   a slide rail catch which is movable between on the one hand, a locked position where said catch immobilises the two sections relative to each other and on the other hand, an unlocked position where said catch allows the mobile section to slide, the slide rail catch being brought resiliently towards its locked position,
   a memorisation runner which is sliding mounted relative to the fixed section parallel to the longitudinal direction, this runner being placed outside the inner volume of the slide rail,
   an attachment device of the memorisation runner which is movable between on the one hand, an attached position where said attachment device fixes the memorisation runner to the mobile section and on the other hand, an unattached position where said attachment device does not fix the memorisation runner to the mobile section,
   first control means adapted to move the slide rail catch from its locked position to its unlocked position so as to allow the mobile section to slide forward without the memorisation runner moving, this memorisation runner restricting the backward movement of the mobile section while defining a memorised position of the mobile section,
   and second control means adapted to move simultaneously the slide rail catch from its locked position to its unlocked position and the attachment device (60) from its unattached position to its attached position, so as to allow the mobile section and the memorisation runner to slide simultaneously relative to the fixed section, either forwards or backwards, in order to adjust the memorised position of the seat,
   characterised in that the memorisation runner engages by fitting with a single flange of the fixed section,
   in that a runner catch is carried by the memorisation runner and is movable between on the one hand, a locked position where said runner catch immobilises the memorisation runner relative to the fixed section and on the other hand, an unlocked position where said runner catch does not immobilise the memorisation runner, the runner catch being in the locked position at least when the mobile section returns to the memorised position, and in that the flange carrying the memorisation runner comprises notches with which the memorisation runner catch engages when the runner catch is in the locked position.

2. A slide rail according to claim 1, wherein the notches are carried by the hook-shaped return of the flange carrying the memorisation runner.

3. A slide rail according to claim 1, wherein the runner catch is brought resiliently to its locked position by a spring mounted on the memorisation runner with the result that in the unattached position of the attachment device, the memorisation runner is locked on the fixed section.

4. A slide rail according to claim 3, wherein the attachment device is brought resiliently to its unattached position.

5. A slide rail according to claim 4, wherein the first control means move the attachment device into its unattached position simultaneously to the movement of the slide rail catch from its locked position to its unlocked position to allow the mobile section to slide forward without the memorisation runner moving.

6. A slide rail according to claim 5, wherein the attachment device is mounted on the second control means.

7. A slide rail according to claim 6, wherein the first and second control means are mounted on a support part integral with the mobile section and the first control means activate the second control means to move the slide rail catch from its locked position towards its unlocked position.

8. A slide rail according to claim 7, wherein the support part carries a pawl which is mounted moving between an engaged position where it engages with the second control means to hold the slide rail catch in its unlocked position when the mobile section slides forwards and backwards without the memorisation runner moving, and a disengaged position where it abuts against the memorisation runner.

9. A slide rail according to claim 7, wherein the mobile section is of inverted U-shaped transverse section having a web and two flanges which extend outwards and upwards by a return which is engaged under the hook-shaped return of the fixed section, the support part including a web fixed to the web of the mobile section and an overlap extending parallel to the flange of the fixed section which carries the memorisation runner, a stop pin projecting from the web of the support part to abut, simultaneously with the pawl, against the memorisation runner, when the mobile section returns to the memorised position.

10. A slide rail according to claim 9, wherein the first means comprise a control arm rotary mounted on the support part web, and a rod rotating integrally with said arm, said rod having a nose and a pin which engage respectively with the second control means and the attachment device.

11. A slide rail according to claim 10, wherein the second control means comprise a flank extending approximately parallel to the overlap of the support part being rotary mounted on this overlap, a rear end of said flank supporting a lug extending transversally above the web of the mobile section so as to be in contact with the slide rail catch.

12. A slide rail according to claim 11, wherein the memorisation runner carries on the one hand, a side wedge fitted with a back stop which extends by an inclined surface downwards and forwards and on the other hand, a rotary longitudinal arm a front end of which carries the runner catch and a rear end of which is curved on the opposite side from the fixed section.

13. A slide rail according to claim 12, wherein the attachment device of the runner includes a lever rotary mounted approximately on the rear end of the flank of the second control means and a front end of which has a ramp engaging with the rod pin of the first control means so that the rotary motion of said rod causes a reverse rotation of the attachment device, and the rear end (64) of which has on the one hand, a tracker pin downward pointing so as to engage with the side wedge of the runner and to the rear of which projects a support surface located at the base of the curved rear end of the memorisation runner arm, so that when the runner moves, the support surface engages said curved rear end and the tracker pin is supported against the stop of the runner wedge.

14. The slide rail of claim 1, in combination with a vehicle seat including a seat part fixed to the mobile section of the slide rail.

* * * * *